May 30, 1961 H. F. LIEBRECHT 2,986,429
SELF-LAYING TRACKS
Filed March 11, 1959 4 Sheets-Sheet 1

INVENTOR
HEINRICH FRITZ LIEBRECHT
BY
Dugger & Johnson
ATTORNEY

May 30, 1961  H. F. LIEBRECHT  2,986,429
SELF-LAYING TRACKS
Filed March 11, 1959  4 Sheets-Sheet 2

INVENTOR
Heinrich Fritz Liebrecht
BY
Dugger & Johnson
ATTORNEY

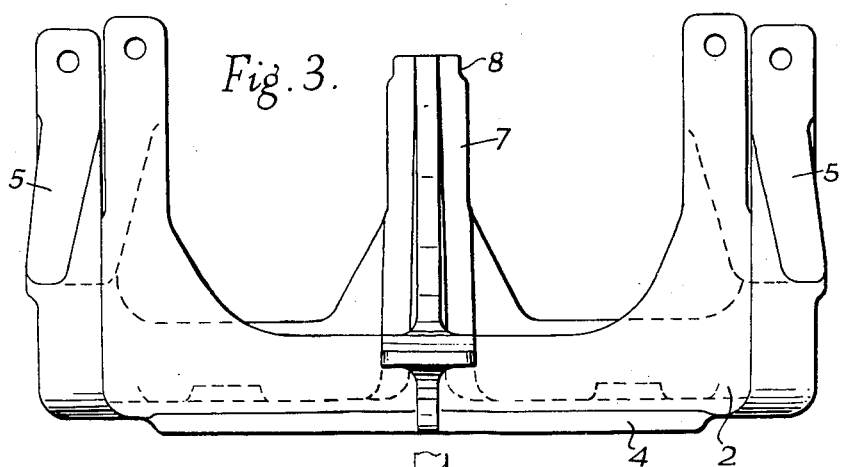
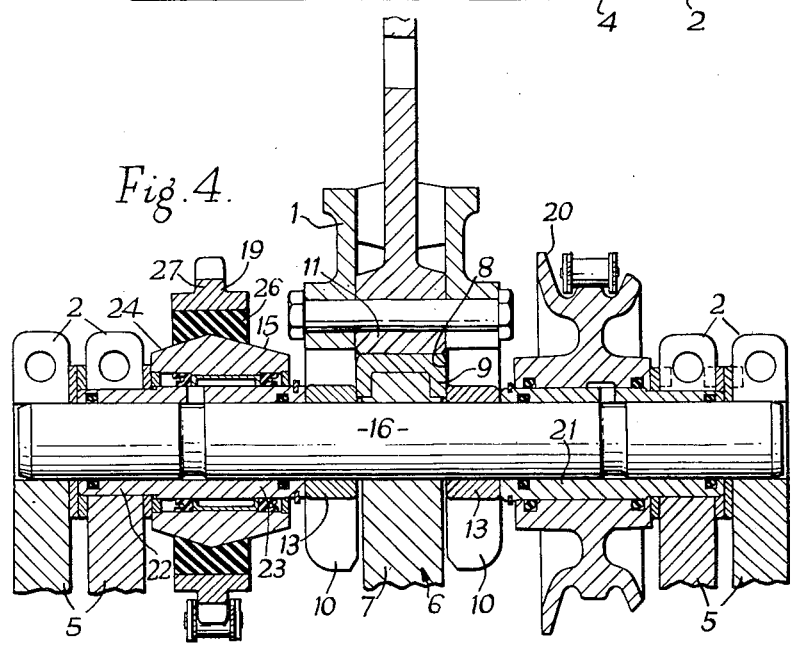
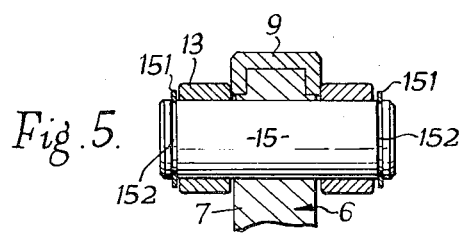

May 30, 1961  H. F. LIEBRECHT  2,986,429
SELF-LAYING TRACKS

Filed March 11, 1959 4 Sheets-Sheet 4

INVENTOR
HEINRICH F. LIEBRECHT
by Dugger & Johnson
ATTORNEYS

United States Patent Office 2,986,429
Patented May 30, 1961

2,986,429

SELF-LAYING TRACKS

Heinrich F. Liebrecht, London, England, assignor to Leeford (London) Limited, London, England, a British company Filed Mar. 11, 1959, Ser. No. 798,742

Claims priority, application Great Britain Mar. 17, 1958

7 Claims. (Cl. 305—19)

This invention relates to self-laying tracks and more particularly to self-laying tracks of the kind comprising six track sections of equal length pivotally connected together in end-to-end relationship, rack means provided on each track section adapted to co-operate during operation of the track with a toothed wheel within the track so that rotation of the toothed wheel causes the track sections to be laid in succession on the ground and to be raised therefrom in succession.

During operation of such a track, for example when the track is traversing a ditch, it may happen that the track sections immediately below the wheel tend to sag away from the wheel causing a rise of the track sections disposed above the wheel. In this way, therefore, the track may become dislodged from the wheel.

In order to overcome this problem, it has been previously proposed to provide two groups of wheels each including three wheels respectively pivotally supported at or inwardly of alternate pivotal connections of the track sections, the wheels of one group being staggered with respect to the wheels of the other group, and two, in effect, endless flexible members respectively engaged with the wheels of the groups, there being also provided means intermediate the wheels of each group serving, in predetermined positions of the track, to effect tensioning of the associated flexible member.

With such an arrangement, breakages of the endless flexible members are liable to occur for two main reasons. First, if as is likely to happen during operation of the track, two of the three wheels of a group are obstructed against rotation by the presence of stones or other foreign bodies between the wheels and the associated flexible member, further rotation of the driving wheel causes the endless flexible member to break and one object of the present invention is to reduce the risk of breakage of the flexible member from this cause.

Secondly, breakage of the endless flexible members is liable to occur owing both to the alternate tensioning and relaxing of the members and the strains imposed therein at times when the lower track sections tend to sag whilst upper track sections tend to rise from the toothed driving wheel. It is, therefore, an object of a more specific form of the invention to reduce the liability to break from this cause of the flexible members.

According to the present invention, in a self-laying track of the kind set forth there are provided two groups of wheels each including three wheels respectively pivotally supported at or inwardly of alternate pivotal connections of the track sections, the wheels of one group being staggered with respect to the wheels of the other group, two, in effect, endless flexible members respectively engaged with the wheels of the groups, and means intermediate the wheels of each group serving in predetermined positions of the track to effect tensioning of the associated flexible members, wherein the flexible members respectively co-operate with the groups of wheels in such a manner that in the event of a sprocket wheel of one group becoming obstructed against rotation thereof, during operation of the track, the chain is caused to move in a direction such as will cause rotation of the obstructed sprocket wheel in a sense opposite to the obstructed sense thereof to release the obstruction.

Preferably, the three wheels of each group comprise sprockets and the endless flexible members comprise chains respectively co-operating with the groups of sprockets.

According to a feature of the invention, a wheel or wheels of each group are individually resiliently supported relative to the track.

The invention will now be described, by way of example, with reference to the accompanying somewhat diagrammatic drawings in which:

Figure 3 is an end elevation of one of said sections of the self-laying track;

Figure 4 is a sectional view taken mainly on the line IV—IV of Figure 1;

Figure 5 is a sectional view on the line V—V of Figure 1; and

Figure 1:
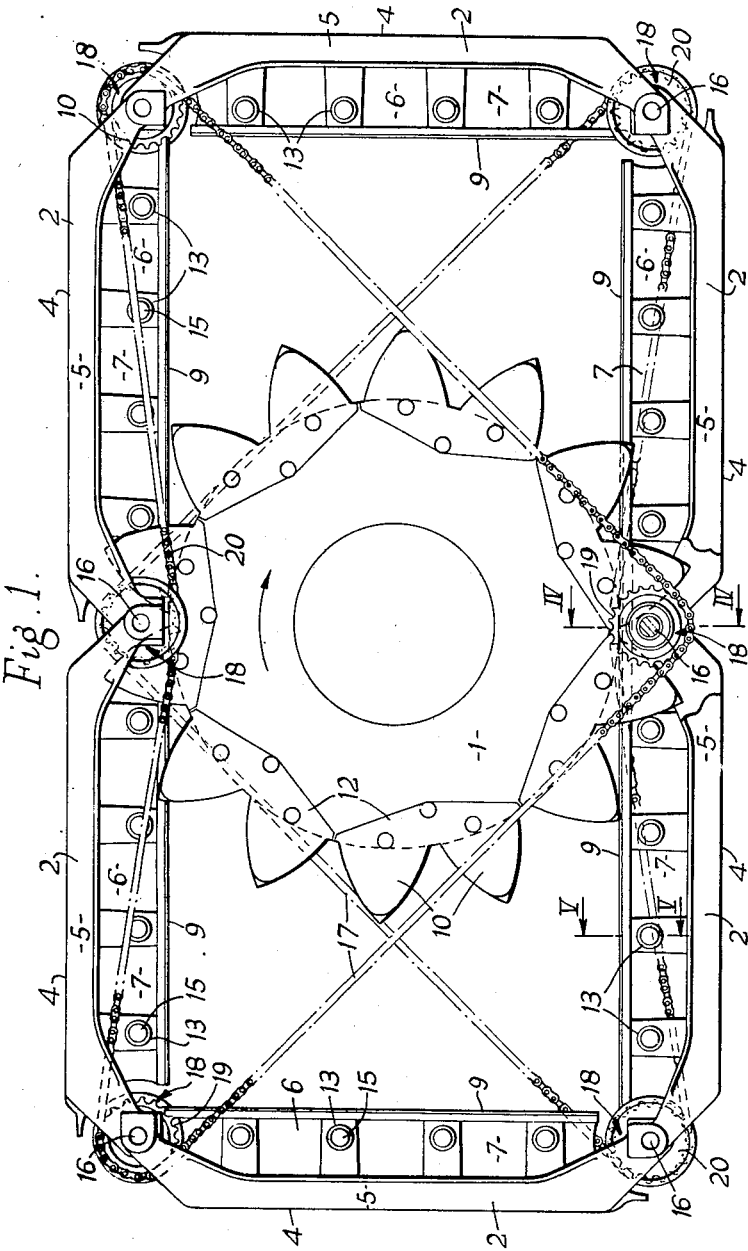
Figure 1 is a side elevation of a self-laying track according to the invention made of a number of separate sections articulated together.

Suitably, on each end of the back axle of a tractor (not shown) is mounted a driving wheel 1 which is embraced peripherally by six track sections 2 of a self-laying track, the track sections being of equal length and pivotally secured together at their ends. As the wheel 1 rotates it lays the sections 2 on the ground and picks the sections up from the ground successively, two positions which the track occupies during rotation of the wheel 1 being depicted in Figures 1 and 2.

Each track section 2 is formed from high duty, light weight alloy and is of channel-shaped cross-section having a flat bottom member 4 which engages the ground during operation of the track and upstanding side members 5. A longitudinally extending, upstanding flange 6 is formed integrally with the section 2 and disposed between the side members 5.

The flange 6 consists of a web 7 formed at its upper end with shoulders 8 upon which is situated a rail 9 of hard wearing metal which is detachably secured to the web 7 as, for example, by countersunk screws (not shown).

On opposite sides of the wheel 1 are provided opposed teeth 10 which together with a rim 11 of the wheel 1 form a peripheral groove round the wheel within which, when the wheel 1 is driven, the flanges 6 of the track sections move with the rails 9 in contact with the wheel rim 11 which, as with the rails 9 is formed from hard wearing metal. By arranging for the toothed periphery of the wheel 1 to embrace a single rail, accumulation of dirt and stones which might otherwise take place in narrow annular spaces between the wheel and the track sections is substantially avoided.

Figure 2:
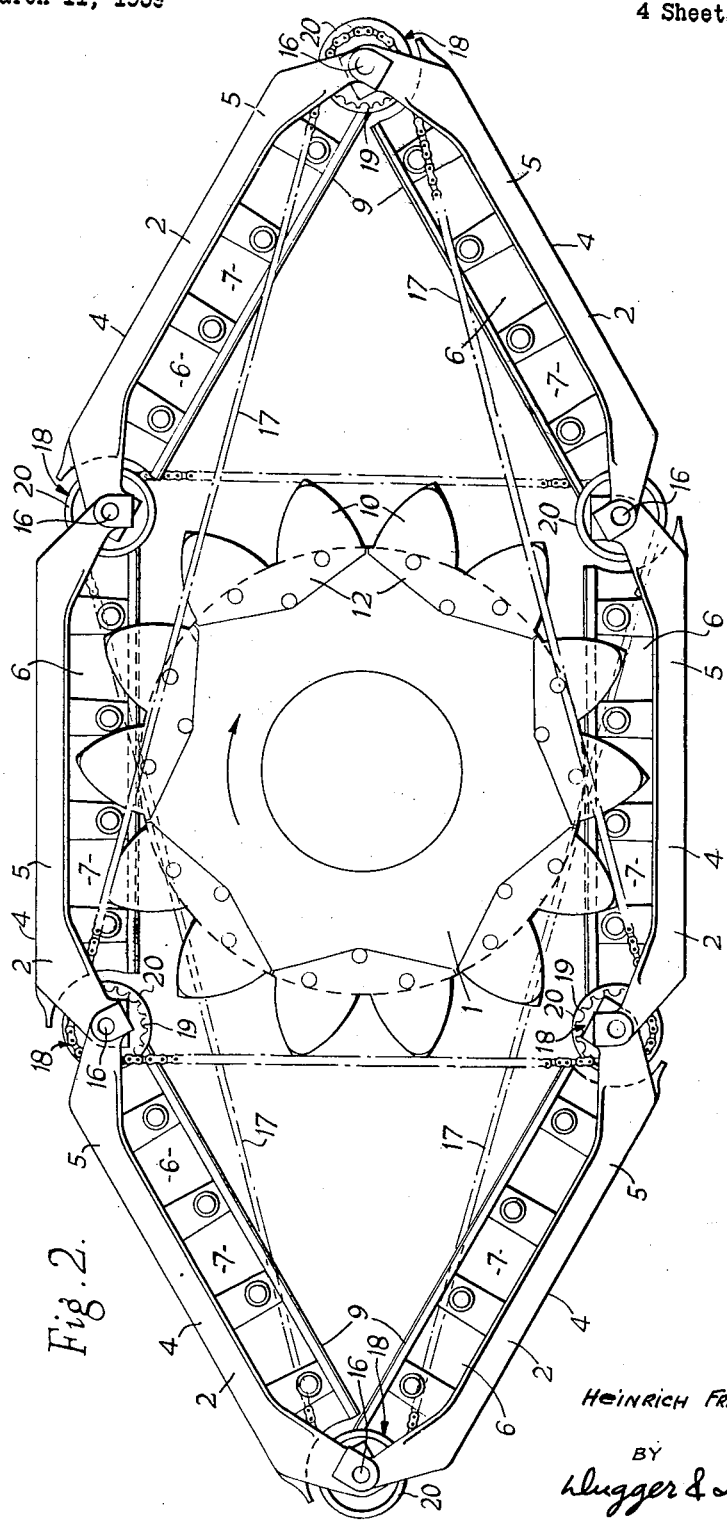
Figure 2 is a further side elevation showing the track sections occupying a different position from that shown in Figure 1.

As shown in Figure 1, the teeth 10 comprise plates 12 each formed with two teeth and bolted to the wheel 1 near the periphery thereof so as to be disposed in opposed relationship to teeth of a similar plate bolted to the opposite side of the wheel 1. The formation of the teeth 10 in pairs on the plates 12 is a particularly convenient construction because, in the event of wear taking place on the inner surface of a plate 12, the plate can readily be removed from the wheel and its inner surface ground to remove defects caused by wear. Instead of being formed with the plates 12, the teeth 10 can be formed as radial projections extending from an annular metal member secured to the wheel 1.

On opposite sides of each flange 6 are provided rows of rollers 13 in opposed relationship constituting rack means for engagement by the teeth 10 of the wheel. The rollers 13 are mounted on pins 15 which each project on opposite sides of and transversely with respect to the associated flange 6 and are retained thereon by rings 151 which engage in grooves 152 at opposite ends of the pins 15.

As will be seen from Figure 3, the track sections 2 each taper from one end to the other thereby enabling the narrow end of one section to nest within the wider end of an adjacent section. At each pair of co-operating ends of the track sections 2 is provided a spindle 16 which extends transversely between and is mounted in aligned apertures in the side members 5 of the co-operating track sections 2 thereby pivotally securing together the adjacent co-operating track sections.

In order to prevent radial separation of the track from the top or bottom side of the wheel 1, there are provided two parallel and, in effect, endless flexible members in the form of chains 17 which are mutually spaced laterally and disposed on respective opposite sides of the wheel 1. For engaging the chains 17 there are disposed on opposite sides of the wheel 1 six wheel groups 18, mounted respectively on the spindles 16. Each group of six wheels comprises three sprockets 19 which co-operate with the associated chain and alternate with three plain pulleys 20, the sprockets 19 of one group of wheels 18 being opposed to the pulleys 20 of the other group. The diameter of the pulleys 20 is so chosen that in the position indicated in Figure 1, the pulleys 20 immediately below and above the centre of the wheel 1 respectively serve to effect desired tensioning of the chains 17 in engagement therewith.

It will thus be appreciated that, as shown in Figure 4, there is mounted upon each spindle 16 a sprocket 19 and a pulley 20 disposed on respective opposite sides of the flange 6 inwardly with respect to the nested side members 5 of adjacent track sections 2. The pulley 20 is rotatable disposed on a bearing sleeve 21 which is mounted on the spindle 16 and engages within an aperture formed in the adjacent track section side member 5, whilst the sprocket 19 is rotatably mounted on a bearing sleeve 22 which is secured within an aperture formed in the adjacent track section side member 5.

The sprocket 19 includes a hub part 23 including a needle roller bearing 191 for free rotation of the sprocket on the bearing sleeve 22. Externally, the hub part 23 is formed with oppositely inclined conical surfaces 24 and 25 which engage complementary internal surfaces of a ring 26 of resilient material, for example rubber. Outwardly of the ring 26 the sprocket 19 includes a further ring 27 from which sprocket teeth 28 extend radially. The resilience imparted to the sprocket 19 by the ring 26 serves to lessen stresses arising in the chains 17 by the alternate tensioning and slackening thereof during operation of the track. Also, the tendency of the chains 17 to break due to the presence of foreign bodies tending to cause radial separation of the track from the wheel 1 is substantially reduced.

It may be observed that an axial section through any of the bottom wheel groups would be identical to Figure 4, and an axial section through any of the top wheel groups would be identical to Figure 4 inverted.

Instead of mounting the sprockets 19 and the pulleys 20 on the spindle 16, the same could alternatively be mounted on inner ends of links respectively supported at their outer ends on the spindle 16.

During operation of the self-laying track, particularly on soft ground, stones and earth tend to collect in between the side walls 15 of the track sections 2 as the sections successively make contact with the ground. Upon raising of a particular section 2 from the ground by rotation of the wheel 1, the stones and earth collected therein shower downwards along the section and tend to obstruct rotation relative to the associated chain 17 of the sprocket 19 at the lower end of the track section. In the event of such obstructions between a sprocket and chain, the positive engagement of the chain with its three sprockets together with the forward movement of the track sections causes the obstructed chain and sprocket to move in the sense opposite to the obstructed sense and so eject the stone or other obstruction.

A more detailed description of the action of applicant's present construction is described as follows with reference to an attached print marked Figures 6 to 9. In these drawings $x$ indicates a piece of chain that is increasing in length and $y$ indicates a piece of chain that is diminishing in length. $s$ indicates chain length remaining constant.

Figure 6:
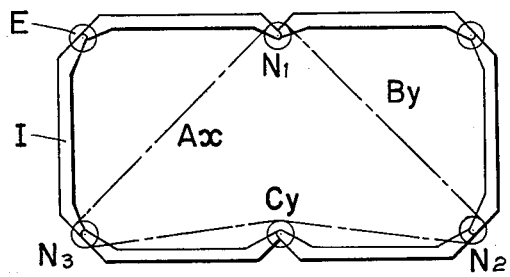
Figures 6 to 9 show a series of side elevations of the track sections in various positions to better illustrate the operation of the apparatus of this invention.

The operation is as follows:

*Position Figure 6.*—Wheels N2 and N3 stationary (chain restrained by idler). Where N1 turns anti-clockwise, distance A increases, B decreases.

Figure 7:
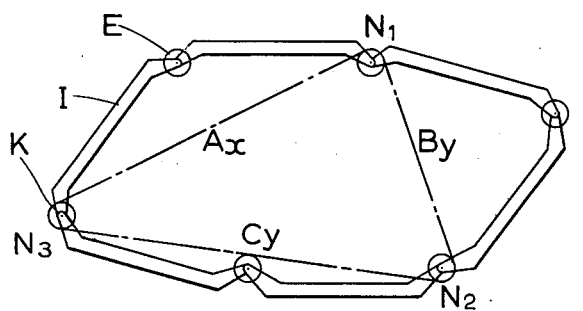

*Position Figure 7.*—Wheel N2 remains stationary, wheel N1 turns anti-clockwise. Wheel N3 turns slowly clockwise when not hindered. A stone between A and N3 is thrown out by this motion. A stone at K between C and N3 stops wheel N3. A is lengthened by B and C being shortened and thus under tension relieving N$s$ from tendency to turn clockwise. (In practice this is the difficult position, stones being showered on chains by track links I being turned over.)

Figure 8:
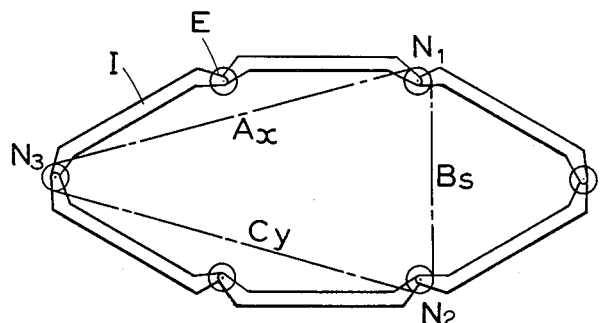

*Position Figure 8.*—Point N3 moves upwards, wheel N3 still turning clockwise where unobstructed. When obstructed, the action as shown in Figure 7 occurs (until position Figure 9 is reached).

Figure 9:
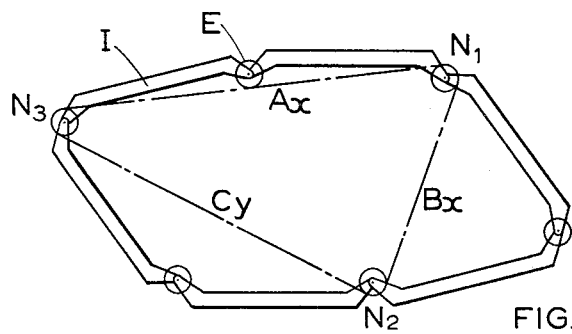

*Position Figure 9.*—Point N1 moves forward causing now strand B to be lengthened. This is a pronounced movement tensioning B and freeing wheel N3 from the tendency to turn clockwise and causes it for a period to turn anti-clockwise to reject any stone between M3 and C. Shortly thereafter the turning of A over idler $x$ causes wheel N3 again to rotate clockwise for a short period. This shaking of wheel N3 releases obstructions on either side.

I claim:

1. A self-laying track comprising a toothed wheel, six track sections of equal length pivotally connected together in end-to-end relationship and surrounding the toothed wheel, rack means provided on each track section adapted to co-operate during operation of the track with the toothed wheel within the track so that rotation of the toothed wheel causes the track sections to be laid in succession on the ground and to be raised therefrom in succession, two groups of wheels each including three sprocket wheels respectively pivotally supported adjacent alternate pivotal connections of the track sections, the wheels of one group being staggered with respect to the wheels of the other group; two, in effect, endless chains respectively engaged with the sprocket wheels of the groups, and means intermediate the wheels of each group serving in predetermined positions of the track to effect tensioning of the associated flexible members; whereby the chains respectively co-operate with the groups of wheels in such a manner that in the event of a sprocket wheel of one group becoming obstructed against rotation thereof, during operation of the track, the chain is caused to move in a direction such as will cause rotation of the obstructed sprocket wheel in a sense opposite to the obstructed sense thereof to release the obstruction.

2. A self-laying track as claimed in claim 1 wherein the sprocket wheels are individually resiliently supported relative to the track.

3. A self-laying track as claimed in claim 2, wherein the track sections are each of channel-shaped cross-section having upstanding side members between which projects a longitudinally extending flange formed integrally with the track section and, on respective opposite sides of the flange are provided rows of opposed rollers adapted to co-operate with pairs of teeth of the toothed wheel, the said teeth being mounted in opposed relationship on opposite sides of the toothed wheel.

4. A self-laying track as claimed in claim 3, wherein mounted on the flange is a rail of hard wearing metal which is adapted to engage the rim of the toothed wheel, the said rim also being formed from hard wearing metal.

5. A self-laying track as claimed in claim 3, wherein the teeth on each side of the toothed wheel are formed on a plurality of plates removably secured to the associated side of the toothed wheel.

6. A self-laying track comprising a toothed wheel, six track sections of equal length pivotally connected together in end-to-end relationship and surrounding the toothed wheel, rack means provided on each track section adapted to co-operate during operation of the track with the toothed wheel within the track so that rotation of the toothed wheel causes the track sections to be laid in succession on the ground and to be raised therefrom in succession, two groups of wheels each including three sprocket wheels respectively pivotally supported adjacent alternate pivotal connections of the track sections, the wheels of one group being staggered with respect to the wheels of the other group; two, in effect, endless chains respectively engaged with the sprocket wheels of the groups, and means intermediate the wheels of each group serving in predetermined positions of the track to effect tensioning of the associated flexible members; whereby the chains respectively co-operate with the groups of wheels in such a manner that in the event of a sprocket wheel of one group becoming obstructed against rotation thereof, during operation of the track, the chain is caused to move in a direction such as will cause rotation of the obstructed sprocket wheel in a sense opposite to the obstructed sense thereof to release the obstruction; each sprocket comprising a hub part and an outer ring formed with sprocket teeth, and a ring of resilient material disposed between the hub part and the outer ring.

7. A self-laying track as claimed in claim 6 wherein the hub part is formed with outer, oppositely inclined conical surfaces adapted to engage complementary inner surfaces of the resilient ring.

References Cited in the file of this patent

UNITED STATES PATENTS

| | | |
|---|---|---|
| 2,346,089 | Singer | Apr. 4, 1944 |

FOREIGN PATENTS

| | | |
|---|---|---|
| 157,163 | Sweden | Dec. 4, 1956 |
| 788,788 | Great Britain | Jan. 8, 1958 |